United States Patent [19]

Martinez

[11] Patent Number: 4,770,061

[45] Date of Patent: Sep. 13, 1988

[54] TRANSMISSION MECHANISM WITH MAGNETIC CLUTCH

[76] Inventor: Carlos C. Martinez, Carretera de Castilla, 340, El Ferrol La Coruna, Spain

[21] Appl. No.: 868,623

[22] Filed: May 29, 1986

[30] Foreign Application Priority Data

May 31, 1985 [ES] Spain .................................... 543746

[51] Int. Cl.$^4$ ............................................ F16H 57/10
[52] U.S. Cl. .................................... 74/752 D; 74/780; 74/792; 74/799; 192/84 AA
[58] Field of Search ...................... 74/752 D, 773, 777, 74/780, 789, 792, 799, 751; 192/84 B, 84 AA

[56] References Cited

U.S. PATENT DOCUMENTS

| | | | |
|---|---|---|---|
| 804,438 | 11/1905 | Simonds | 74/792 |
| 1,350,324 | 8/1920 | MacMillan | 74/780 |
| 1,476,458 | 12/1923 | Murray | 74/780 X |
| 1,802,630 | 4/1931 | Cotal | 74/752 D |
| 2,241,334 | 5/1941 | Stucatur | 74/752 D |
| 2,488,756 | 11/1949 | Baker | 74/792 |
| 2,605,651 | 8/1952 | Winther | 74/752 D |
| 3,080,774 | 3/1963 | Nickerson et al. | 74/780 |
| 4,186,625 | 2/1980 | Chamberlain | 74/777 X |

FOREIGN PATENT DOCUMENTS

| | | | |
|---|---|---|---|
| 806513 | 12/1936 | France | 74/780 |
| 30791 | 6/1920 | Norway | 74/780 |
| 476160 | 10/1936 | United Kingdom | 74/751 |
| 690378 | 4/1953 | United Kingdom | 74/780 |
| 728908 | 4/1955 | United Kingdom | 74/780 |

*Primary Examiner*—Leslie A. Braun
*Assistant Examiner*—Dwight G. Diehl
*Attorney, Agent, or Firm*—McGlew and Tuttle

[57] ABSTRACT

Coupling mechanism for transmission between a drive shaft and a driven shaft including support frames, first and second lined independent axle shafts rotatably mounted on the support frame, a box, in the frame and planet and satellite pinion assembly including a first planet pinion connected to the first axle and a second planet pinion connected to the second axle. The first and second satellite pinions are mounted in the box, independent of the support frame. Two coil clutch members are mounted on the box, coaxial with the axle shaft. Each of the coil clutch members being placed on either side of the box and including a plurality of coils and being traversed by one of the axle shafts that are independently mounted. Two driving clutch members, formed of ferromagnetic material, are each integrally mounted to one of the first and second axle shafts in a position parallel to and near to one of said coil clutch members, respectively. A commutator device is mounted externally on the box for supplying power to the coils.

6 Claims, 3 Drawing Sheets

TRANSMISSION MECHANISM WITH MAGNETIC CLUTCH

FIELD AND BACKGROUND OF THE INVENTION

The present invention refers to a transmission mechanism between a drive shaft and a driven shaft, especially applicable in vehicles, vessels, and industrial uses in general.

More specifically, the mechanism of the invention is intended to serve as a clutch between a drive shaft and a driven shaft.

Traditional clutches, used especially in vehicles and vessels, have the drawback of their being limited, when there is an attempt to take advantage of the drive shaft's greatest torque in the driven transmission shaft, without there occurring a risk of damage.

The purpose of the present invention is to obtain a transmission mechanism, usable especially as a clutch, that does not have the limitations of traditional clutches.

Another purpose of the invention is to obtain a transmission mechanism that may also serve as revolution variator, torque converter, speed regulator, and idler.

SUMMARY OF THE INVENTION

In accordance with the present invention, the coupling mechanism for transmission includes a support frame on which are mounted two independent, aligned axle shafts that are able to rotate freely. These two axle shafts are connected to each other by means of an intermediate assembly of planet and satellite pinions, of which each one of the planet pinions is integral with one of the axle shafts. The satellite pinions are mounted in a body or box independent of the support frame, which also encloses the planet pinions.

The aforementioned box that encloses the planet and satellite pinions holds two external coil flywheels or coil clutch members that are coaxial with the axle shafts. Each one of these flywheels or clutch members is situated on either side of the box or support and each is traversed by the axle shafts. Moreover, the aforementioned flywheels or clutch members hold a series of coils that are fed through a commutator that is mounted externally on the same box or body. As indicated, the flywheels or clutch members are traversed by axle shafts that are able to rotate freely.

The mechanism of the invention also includes another two driving flywheels or driving clutch members, of ferromagnetic material, that are integrally mounted, one on each axle shaft, in a position parallel and near to the coil flywheels or coil clutch members, holding the coils.

The support frame has secured to it some braking coils that face the driving flywheel. This frame also has mounted on it reversing coils, which face the flywheel holding the coils.

Accordingly, it is an object of the invention to provide an improved coupling mechanism for transmission between the drive and a driven shaft including a support frame and a first and second aligned independent axle shaft rotatably mounted on the support frame. A box is provided within the support frame wherein there is located a planet and satellite pinion assembly including a first planet pinion connected to the first axle and a second planet pinion connected to the second axle. The first and second satellite pinions are mounted in the box independent of the support frame. Two coil flywheels are provided which are mounted on the box, coaxial with said axle shafts, each of said coil flywheels being placed on either side of said box and including a plurality of coils and being traversed by one of said axle shafts that are independently mounted. Two driving flywheels are also provided which are made of a ferromagnetic material. Each of the driving flywheels are integrally mounted to one of the first and second axle shafts, in a position parallel to and near to one of said second coil flywheels, respectively. A commutator means is also provided for supplying power to the coils. The commutator is mounted on the outside or external portion of the box.

The characteristics set forth, as well as others peculiar to the invention, together with the operation and application of the mechanism of the invention, will be understood more easily with the following description, made with reference to the attached drawings, which represent, in schematic fashion and for purposes of a non-restrictive example, a possible form of execution.

In the drawings:

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
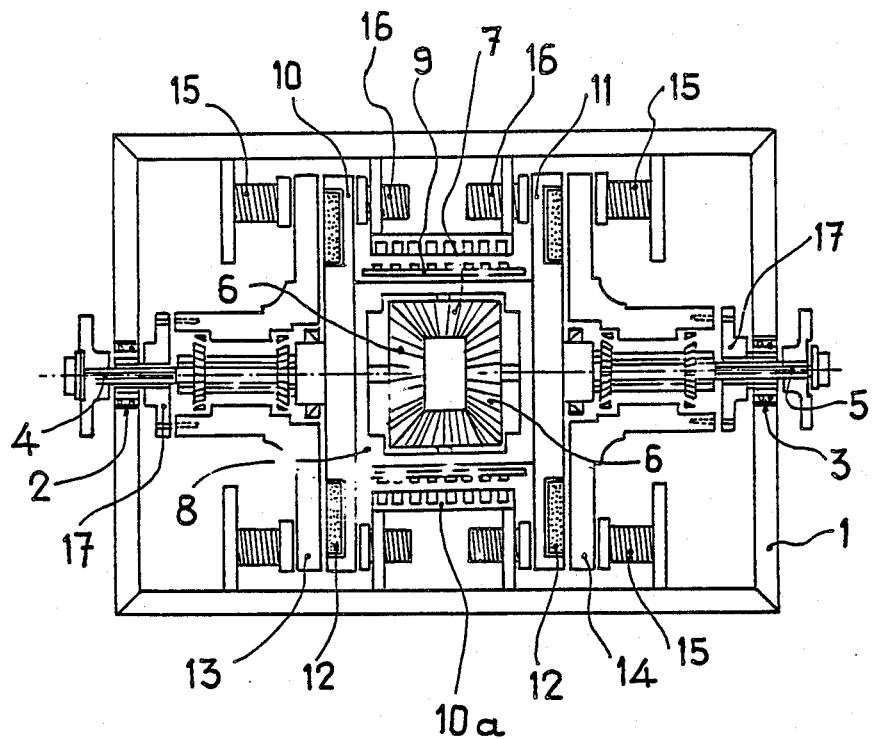
FIG. 1 is a diametral section of a coupling mechanism constructed in accordance with the invention.

As can be seen in FIG. 1, the coupling mechanism includes support frame 1 on which are mounted, by means of bearings 2 and 3, two independent and aligned axle shafts 4 and 5 that are able to rotate freely. These two axle shafts are connected to each other by means of an assembly of planet pinions 6 and satellite pinions 7, housed in box or body 8 that is independent of frame 1. Each one of planet pinions 6 is integral with one of the axle shafts 4 and 5, while satellite pinions 7 are mounted in box 8.

This box also has commutator 9 mounted externally on it for receiving current from brushes 10'. Box 8 also has externally mounted on it two coil flywheels or coil clutch members 10 and 11, coaxial with axle shafts 4 and 5; one of the coil flywheels or coil clutch members is situated on either side of said box and they are traversed by the aforementioned axle shafts that are able to rotate freely. Flywheels or coil clutch members 10 and 11 have mounted on them a series of coils 12, which are fed through commutator 9.

The coupling mechanism also includes two driving flywheels or driving clutch members 13 and 14 of ferromagnetic material. Flywheel or driving clutch member 13 is integrally mounted on axle shaft 4, while flywheel or driving clutch member 14 is integrally mounted on axle shaft 5. These flywheels or clutch members are parallel and near to flywheels or coil clutch members 10 and 11, the holders of coils 12.

Frame 1 also has braking coils 15 and reversing coils 16 mounted on it.

The attachment of flywheels or driving clutch members 13 and 14 to the corresponding axle shafts is effected by means of fluted plates 17.

Brushes 10' are mounted on a support that at the same time holds reversing coils 16.

Coil-bearing flywheels or coil clutch members 11 and 10 have, on the surfaces facing the driving flywheels or driving clutch members 13 and 14, recesses or boxes, in the form, for example, of a circular crown in which coils 12 are housed.

With the construction described, if we assume that axle shaft 5 is the one connected to the driving motor, its rotation will cause the rotation of flywheel or clutch member 14 and of box 8 in which the planet and satellite pinions are housed, without axle shaft 4 being activated. As soon as coils 12 of flywheels clutch members 10 and 11 are activated, the rotation of flywheel or clutch member 10 with its coils activated will cause the rotation of flywheel or clutch member 13 and with it that of axle shaft 4. By means of the activation of coils 16, braking of flywheels 10 and 11 is obtained, producing reverse motion by the assembly of planet and satellite pinions.

Figure 2:
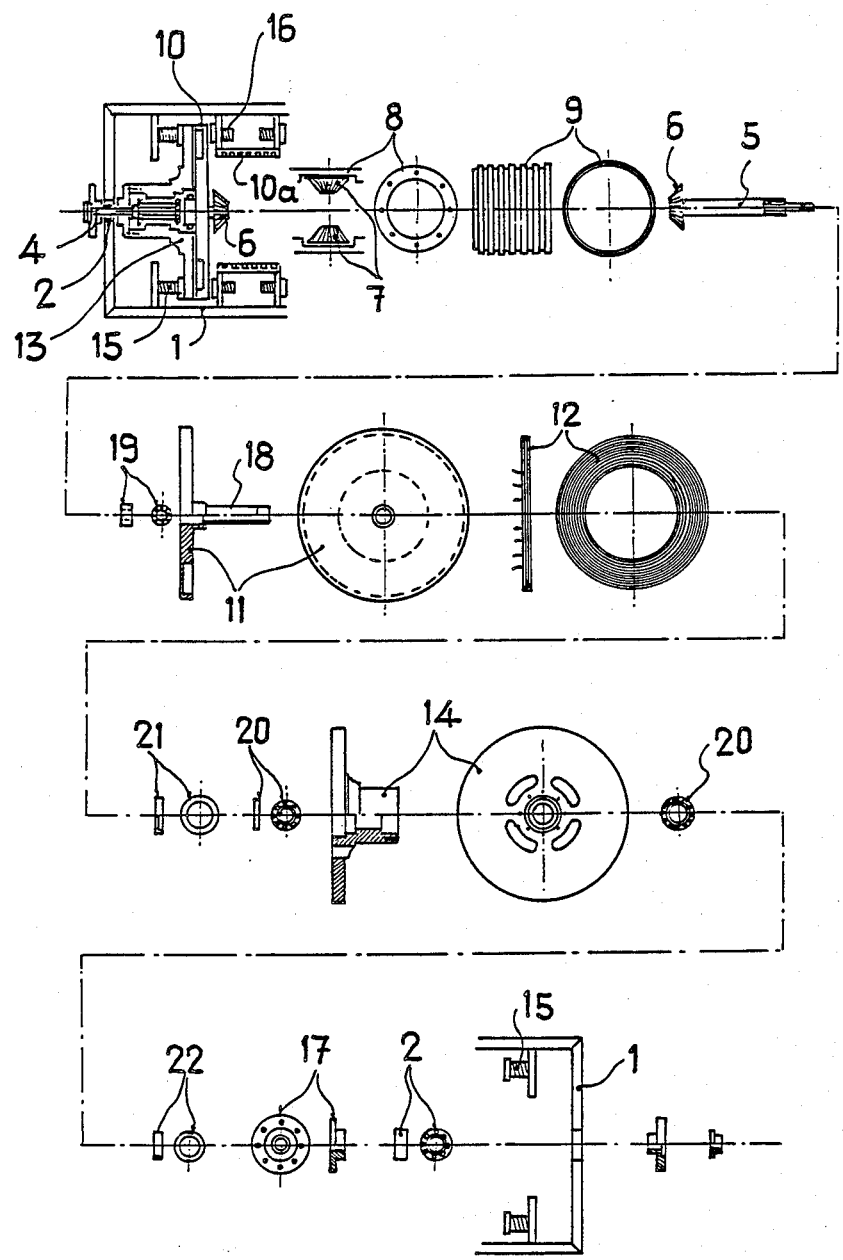
FIG. 2 is an exploded partial sectional side elevational and end elevational views of the mechanism of FIG. 1 disassembled.

In the disassembled parts of FIG. 2, a possible form of execution is represented, indicating the same parts with identical reference numbers.

Flywheels or magnetic coil clutch members 10 and 11 have tubular axle 18 traversed axially by the corresponding axle shafts, with interposition of bearings 19. In this disassembly, there can be seen the toric recess of flywheels or clutch member 10 and 11 and the same configuration for the assembly of coils 12. The tubular axle passes through flywheels 13 and 14, with an assembly of bearings 20, grease retainer 21, and lock nut 22.

In this FIG. 2, there can likewise be seen a special form of box or body of satellite pinions 8 on which commutator 9 is mounted for receiving current.

Given that, in the mechanism of the invention, transmission is produced by means of a magnetic field, if the intensity of the field is varied, either by the number of coils excited or by their intensity of excitation, the driving force can be varied from 0 up to equally it with that of the drive shaft in the use of the mechanism, clutch. Among other advantages, this system permits the enormous advantage of engaging the clutch, taking advantage of the greatest torque (high rate of revolutions of the drive shaft), without danger to the integrity of the system, thereby resolving the problem pointed out at the Background of the Invention portion of this specification.

As the drive between axle shafts, driving and driven, is produced by means of the action of the indicated magnetic field of variable intensity, when setting the number of revolutions of the drive shaft, the desired revolutions are obtained in the driven, by merely selecting the intensity of the magnetic flux, thereby being able to use the mechanism as a variator of revolutions.

Based on what has been set forth above, it follows that the mechanism satisfies the conditions of a conventional torque converter, with the advantage over it of simplicity and lower cost.

The mechanism of the invention can also be used as a speed regulator. This property has its greatest application in the automotive field, especially for its use in areas of limited speed. When the speedometer's needle rests on the pre-set position, an electronic mechanism such as a current interrupter can act on the electromagnetic coils of the idler, increasing the action of the latter as a function of the deviation experienced by the aforementioned needle from a predetermined desired speed.

Once a a speed has been set, the needle of a speedometer reaches the prefix point, an electric signal will be transmitted to some relays which, in turn, will connect with the brake coils 15 which can be disposed in variable number.

As the needle of the speedometer moves in an upward or downward movement, more, or fewer coils will be connected, thus resulting in an increase, or decrease of the magnetic field.

The use of the mechanism of the invention as an idler is obtained by controlling the current of electrical coils 15 for the electromagnetic braking of the transmission shafts. This function similarly to the speed regulatory aspects discussed above.

Lastly, the mechanism of the invention is usable as a reverser, since coils 16 are attached to frame 1 and when these coils receive current they brake, by means of the magnetic field created, the central rotor constituted by flywheels 10 and 11 and the planet and satellite pinion box 8, thereby producing reverse motion through said planet and satellite pinions in the driven axle shaft.

Figure 3:
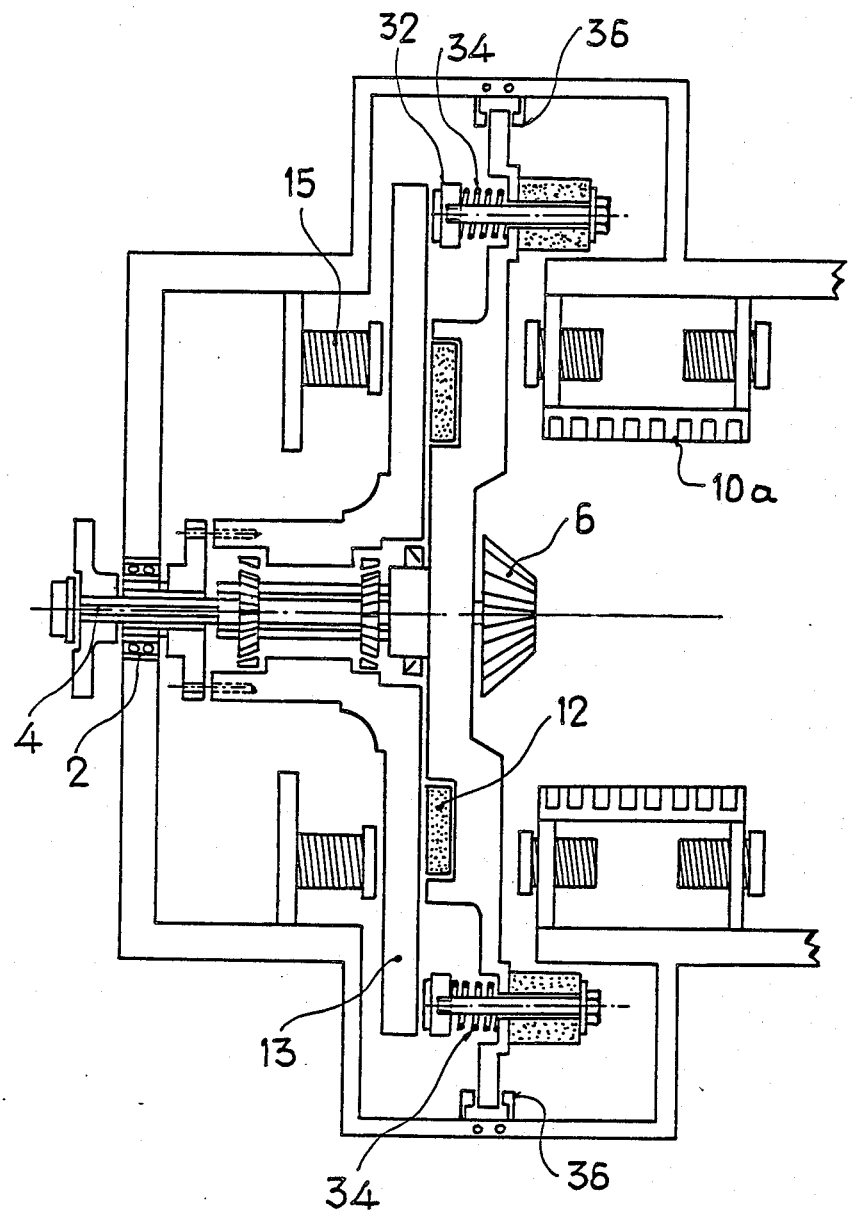
FIG. 3 is a variation of the mechanism of FIG. 1.

It can be provided for flywheel or coil clutch member 10 to have a greater radius that permits the coupling of a series of friction elements 32 that are constantly impelled by springs 34 against driving flywheel or driving clutch member 13, so that when both axles operate at the same number of revolutions, the clutch operates as a mechanical clutch, which can be eliminated by means of the corresponding electrical coils, while its peripheral edge serves as a disc brake. This includes a caliper 36, which acts as a disc brake that can be used in case of reversing (see FIG. 3).

As can be understood, the mechanism of the invention can be completed by means of arrangements different from those described in FIGS. 1 and 2, without deprting from the framework of the present invention.

Having sufficiently described the nature of the invention, as well as the manner of accomplishing it in practice, it should be put on the record that the arrangements indicated above may be modified in details insofar as they do not alter its fundamental principle.

I claim:

1. Coupling mechanism for transmission between a drive shaft and a driven shaft comprising: support frames; first and second aligned independent axle shafts rotatably mounted on said frame; a box, in said frame, planet and satellite pinion assembly including a first planet pinion connected to said first axle, a second planet pinion connected to said second axle and first and second satellite pinions mounted in said box independent of said support frame; two coil clutch members, mounted on said box, coaxial with said axle shafts, each of said coil clutch members being placed on either side of said box and including a plurality of coils and being traversed by one of said axle shafts that are independently mounted; two driving clutch members, formed of a ferromagnetic material, each integrally mounted to one of said first and second axle shafts, in a position parallel to and near to one of said coil clutch members, respectively; a commutator means mounted externally on said box for supplying power to said coils; a brake coil support frame; brake coils, facing said driving clutch members, mounted on said brake coil support frame; reversing coil support frame; and, reversing coils facing said coil clutch member, mounted on said reversing coil support frame.

2. Coupling mechanism according to claim 1, wherein said reversing coils are situated adjacent said box, that houses said planet and satellite pinion assembly, said reversing coil support frame is attached within said frame and said reverse coil support frame having brushes mounted thereto for providing current to said commutator.

3. A coupling mechanism for transmission between a drive shaft and a driven shaft comprising a support frame; first and second aligned independent axle shafts rotatably mounted on said frame; a box, in said frame; planet and satellite pinion assembly, including a first planet pinion connected to said first axle, a second planet pinion connected to said second axle and first and second satellite pinions mounted in said box independent of said support frame; two coil flywheels, mounted on said box, coaxial with said axle shafts, each of said coil flywheels being placed on either side of said box, including a plurality of coils and being traversed by one of said axle shafts that are independent mounted; two driving flywheels, of ferromagnetic material, each integrally mounted to one of said first and second axle shafts, in a position parallel to and near to one of said coil flywheels, respectively; a commutator means mounted externally on said box for supplying power to said coil; brake coil support frame; brake coils, facing said driving flywheel, and mounted on said brake coil support frame; reversing coil support frame attached within said support frame and positioned adjacent said box; reversing coils, mounted on said reversing coil support frame, facing said coil flywheels; and, brushes, mounted on said reversing coil support frame, for providing power to said commutator.

4. Coupling mechanism according to claim 3, wherein said coil flywheel surface facing said driving flywheel having a recess in the form of a circular crown on which said coils are mounted; and, the number of coils activated, as well as the intensity of the activation of said coils, being subject to variation at will.

5. Coupling mechanism according to claim 4, wherein the second of said coil flywheels has a greater radius than the first of said coil flywheels and the second of said coil flywheels houses a series of friction elements each element biased toward the first of said driven flywheels by springs, thereby eliminating the effect of the second said coil flywheels corresponding coils.

6. A coupling mechanism according to either claim 3 or claim 5, wherein the second said coil flywheel acts as a disc brake, for which there is at least a caliper available on its periphery.

* * * * *

UNITED STATES PATENT AND TRADEMARK OFFICE
CERTIFICATE OF CORRECTION

PATENT NO. : 4,770,061

DATED : September 13, 1988

INVENTOR(S) : Carlos C. Martinez

It is certified that error appears in the above-identified patent and that said Letters Patent is hereby corrected as shown below:

Column 2, line 54, change "10'" to --10a--.

Column 3, line 8, change "10'" to -- 10a--.

Signed and Sealed this

Twenty-fourth Day of January, 1989

Attest:

DONALD J. QUIGG

Attesting Officer

Commissioner of Patents and Trademarks